US012579707B2

(12) United States Patent　　(10) Patent No.:　US 12,579,707 B2
Cowles et al.　　　　　　　　　(45) Date of Patent:　　Mar. 17, 2026

(54) SYSTEM AND METHOD FOR INTERACTIVE ASYNCHRONOUS TILE-BASED TERRAIN GENERATION

(71) Applicant: Unity Technologies ApS, Copenhagen (DK)

(72) Inventors: Jeremy Weston Cowles, Berkeley, CA (US); Jon Kyl, Seattle, WA (US); Scott Brandon Peterson, Mountain View, CA (US); Sahil Ramani, Redmond, WA (US); Kristofer David Schlachter, Old Greenwich, CT (US); Rahul Vallivel Subbiah, Sunnyvale, CA (US); Natalya Tatarchuk, Kirkland, WA (US)

(73) Assignee: Unity Technologies ApS, Copenhagen (DK)

( * ) Notice:　Subject to any disclaimer, the term of this patent is extended or adjusted under 35 U.S.C. 154(b) by 262 days.

(21) Appl. No.: 18/144,734

(22) Filed:　May 8, 2023

(65) Prior Publication Data

US 2023/0360284 A1　Nov. 9, 2023

Related U.S. Application Data

(60) Provisional application No. 63/339,384, filed on May 6, 2022.

(51) Int. Cl.
　*G09G 5/00*　　　(2006.01)
　*G06T 11/00*　　(2006.01)
　*G06T 11/60*　　(2006.01)
(52) U.S. Cl.
　CPC ............ *G06T 11/001* (2013.01); *G06T 11/60* (2013.01)

(58) Field of Classification Search
　CPC ....... G06F 9/4401; G06T 1/20; G06T 3/4007; G06T 9/00; G06T 11/001; G06T 11/60; H04L 51/51
　(Continued)

(56) References Cited

U.S. PATENT DOCUMENTS

| | | | |
|---|---|---|---|
| 2007/0171234 A1* | 7/2007 | Crawfis ................... | G06T 17/05 |
| | | | 345/587 |
| 2008/0024519 A1* | 1/2008 | Blanco ................... | G09B 11/00 |
| | | | 345/619 |

(Continued)

OTHER PUBLICATIONS

Fruhstuck, Anna, et al., "TileGAN: Synthesis of Large-Scale Non-Homogeneous Textures", ACM Trans. Graph., vol. 38, No. 4, Article 0, (Jul. 2019), 11 pages.
(Continued)

*Primary Examiner* — Gordon G Liu
(74) *Attorney, Agent, or Firm* — Schwegman Lundberg & Woessner, P.A.

(57)　　　　　ABSTRACT

An interactive tile-based ML terrain generation method is disclosed. At a first phase of a painting of a digital environment using a brush tool, a modification to a terrain surface of the digital environment is approximated. The approximating includes decomposing a stroke of the brush tool into one or more stamps. Each of the one or more stamps changes a height of a portion of terrain surface as the brush tool passes over the portion of the terrain surface. At a second phase of the painting of the digital environment, details are added to the portion of the terrain surface passed over by each of the one or more stamps. The adding of the details includes dividing work associated with the adding of the details into one or more tiles and processing the one or more tiles.

20 Claims, 17 Drawing Sheets

(58) Field of Classification Search
USPC ........................................................ 345/581
See application file for complete search history.

(56) References Cited

U.S. PATENT DOCUMENTS

| 2011/0257949 | A1* | 10/2011 | Vasudevan | ............. | G06N 20/10 |
| | | | | | 703/2 |
| 2021/0178274 | A1* | 6/2021 | St-Pierre | .................. | G06N 7/01 |

OTHER PUBLICATIONS

Guerin, Eric, et al., "Interactive Example-Based Terrain Authoring with Conditional Generative Adversarial Networks", ACM Transactions on Graphics, vol. 36, No. 6, Article 228, (Nov. 2017), 14 pages.
Zhao, Yiwei, et al., "Multi-Theme Generative Adversarial Terrain Amplification", ACM Trans. Graph., vol. 38, No. 6, Article 200, (Nov. 2019), 14 pages.

* cited by examiner

PRODUCTION NETWORK
CORRECT WASTE BY TRIMMING INPUT BY 7

SYSTEM AND METHOD FOR INTERACTIVE ASYNCHRONOUS TILE-BASED TERRAIN GENERATION

CROSS-REFERENCE TO RELATED APPLICATIONS

This application claims the benefit of U.S. Provisional Application No. 63/339,384, filed May 6, 2022, which is incorporated by reference herein in its entirety.

TECHNICAL FIELD

The subject matter disclosed herein generally relates to the technical field of computer graphics systems, and, in one specific example, to computer systems and methods for creating and manipulating terrain within a digital environment.

BACKGROUND OF THE INVENTION

In the world of computer graphics and content generation, the process of generating aspects of a digital environment, such as terrain, is often time consuming and difficult. These terrains may be used in simulations, video games, backgrounds in TV shows and movies, and more. The digital environments can often be very large, and generation of terrain for the environment can be a long manual process, particularly if the terrain is to be aesthetically pleasing. Some automated processes and tools exist for creating terrains; however, they often suffer from issues related to computational efficiency and in some cases visual defects.

BRIEF DESCRIPTION OF THE DRAWINGS

Features and advantages of example embodiments of the present disclosure will become apparent from the following detailed description, taken in combination with the appended drawings, in which.

DETAILED DESCRIPTION

Figure 1A:
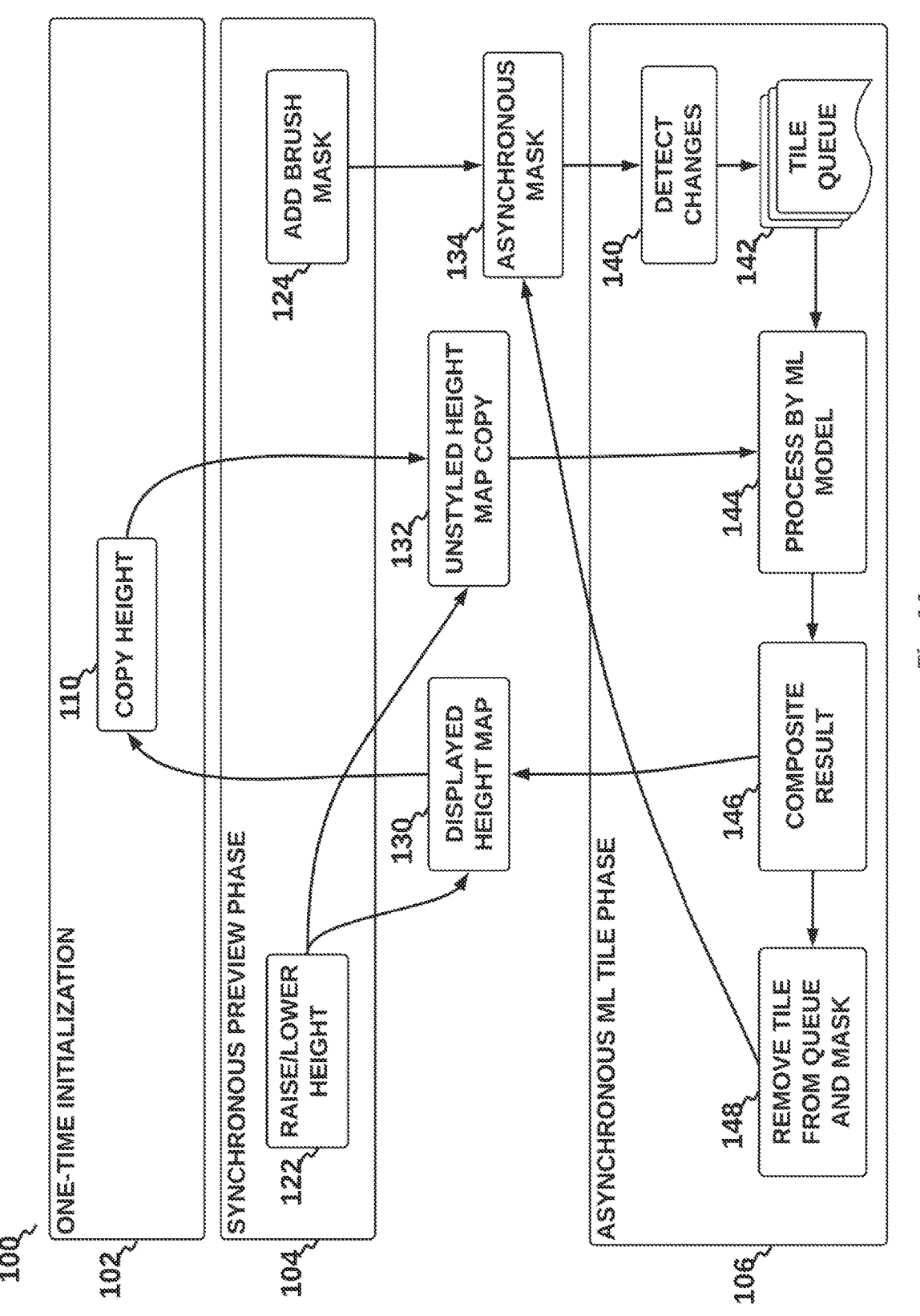
FIG. 1A is a schematic illustrating a flow chart for a method for interactive tile-based ML terrain generation, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The present invention includes apparatuses which perform one or more operations or one or more combinations of operations described herein, including data processing systems which perform these operations and computer readable media which when executed on data processing systems cause the systems to perform these operations, the operations or combinations of operations including non-routine and unconventional operations or combinations of operations.

The systems and methods described herein include one or more components or operations that are non-routine or unconventional individually or when combined with one or more additional components or operations, because, for example, they provide a number of valuable benefits to digital content creators: for example, the methods and systems described herein allow computationally intense non-interactive machine-learning generative models to be applied in an interactive brush system (e.g., within a user interface system with a digital brush tool) wherein the interactive brush system requires fast frame rates. For example, the methods and systems described herein may be implemented within a user interface tool (e.g., a digital brush tool) that may be used to sculpt, texture, and scatter geometry onto a terrain interactively.

In accordance with an embodiment, there is described herein a tile-based machine learning (ML) terrain generation system and method for generating digital terrain within a digital environment (e.g., implemented within a digital brush tool within a user interface). In accordance with an embodiment, the system and method splits work into a fast phase and a slow phase wherein the fast phase may be used for user interaction (e.g., including producing quick output and receiving quick user feedback). Furthermore, the slower phase may be asynchronous such that it does not slow down the fast phase. For example, a user interacting with the system and method (e.g., based on the system and method being implemented as a user interface tool) may receive sufficient feedback in the fast phase to make agile tactile structural choices during terrain generation in a digital environment, while finer detail may appear subsequently in the slower phase (e.g., a refinement phase) that may enhance a user's work without breaking their flow. For example, the fast phase may allow a user to move a brush tool quickly within a digital environment and receive quick feedback (e.g., see the displayed environment modified with large modifications quickly), while the slower phase may additionally apply fine detail asynchronously afterwards (see FIG. 1B, FIG. 1C, and FIG. 1D for an example of the system and method).

In accordance with an embodiment, the fast phase may be a highly optimized real-time feedback phase that presents (e.g., displays) an approximation to users for the purpose of feeling responsive. The slower asynchronous ML Tile phase adds detail that refines the output from the fast phase to produce more realistic patterns, generated by (e.g., inferred by) a machine-learning generative model. The slower phase may run asynchronously in order to accommodate slower higher-cost machine-learning processing while squeezing through memory constraints.

In accordance with an embodiment, the interactive tile-based ML terrain generation system and method may produce the exact results as a non-tiling method or system. Accordingly, the tile-based machine learning (ML) terrain generation system and method may produce more accurate results over other systems and methods that use the practice of overlapping and blending tiles together since overlapping and blending produce visual artifacts in the output.

In accordance with an embodiment, a plurality of ML models may be used within the interactive tile-based ML terrain generation system and method in order to produce various outputs based on a type of brush applied (e.g., by a user during a fast phase of the method). For example, different ML models may be trained to work within the interactive tile-based ML terrain generation system and method in order to produce an output including one of the following: detailed height from coarse input, a model that produces a flow map, a deposition map, and a wear map based on detailed height (flow, deposition and wear maps may be used in texturing), and a model that produces a vegetation canopy with canopy tree height based on detailed terrain height and a mask.

In example embodiments, an interactive tile-based ML terrain generation method is disclosed. At a first phase of a painting of a digital environment using a brush tool, a modification to a terrain surface of the digital environment is approximated. The approximating includes decomposing a stroke of the brush tool into one or more stamps. Each of the one or more stamps changes a height of a portion of terrain surface as the brush tool passes over the portion of the terrain surface. At a second phase of the painting of the digital environment, details are added to the portion of the terrain surface passed over by each of the one or more stamps. The adding of the details includes dividing work associated with the adding of the details into one or more tiles and processing the one or more tiles.

Turning now to the drawings, systems and methods, including non-routine or unconventional components or operations, or combinations of such components or operations, for the interactive tile-based ML terrain generation system and method in accordance with embodiments of the invention are illustrated. In example embodiments, FIG. 1A is a diagram of a flowchart of an interactive tile-based ML terrain generation method 100 that may be used for an interactive user interface digital brush tool. As shown in FIG. 1A, the method 100 includes at least two phases: a fast interactive phase 104, and a slower asynchronous phase 106. In addition, there may be a one-time initialization phase 102. The fast interactive phase 104 may be a synchronous preview phase which produces and displays an output to a display device substantially immediately. In accordance with an embodiment, in order to improve the slower phase 106, a method for dividing work into tiles 142 is used. Furthermore, in order to improve a stability and quality of sculpting ML models used within the method 100 (e.g., used during operation 144), values involving absolute height may be converted into a difference-of-gaussian (DOG). For example, sculpting ML models within the interactive tile-based ML terrain generation system and method may operate on DOG values in order to train an ML model faster and increase an overall quality of the model.

In accordance with an embodiment, at operation 124 of the method 100, within the fast phase 104, a brush mask may be added to a digital brush tool. The brush mask may determine a style with which the brush paints a digital environment. For example, the interactive phase 104 of a brush may reshape a digital surface in the environment by raising or lowering the surface (e.g., at operation 122) immediately (e.g., as a user paints with the tool). The second slower phase 106 adds detail (e.g., fine visual detail) that adapts the output from the first phase 104 to produce more realistic visual patterns, wherein the details are determined (e.g., inferred) by a machine-learning generative model (e.g., at operation 144). The slower phase 106 runs asynchronously in order to accommodate higher-cost processing (e.g., due to the ML model processing of operation 144) while in addition squeezing through potential memory constraints which may be encountered.

In accordance with an embodiment, the fast phase 104 of the brush is a synchronous approximation of a sculpted modification to a terrain surface, wherein a brushstroke (e.g., from a user moving a brush tool within a digital environment via a user interface) is decomposed into a series of stamps, and each stamp runs this step. As an example, the preview phase may be accomplished by modifying the surface (e.g., at operation 122) using an offset multiplied by a brush stamp mask that raises or lowers a patch of terrain. In addition, this brush may also add the brush stamp mask into an asynchronous mask texture at operation 134 of the method.

Figure 1B:
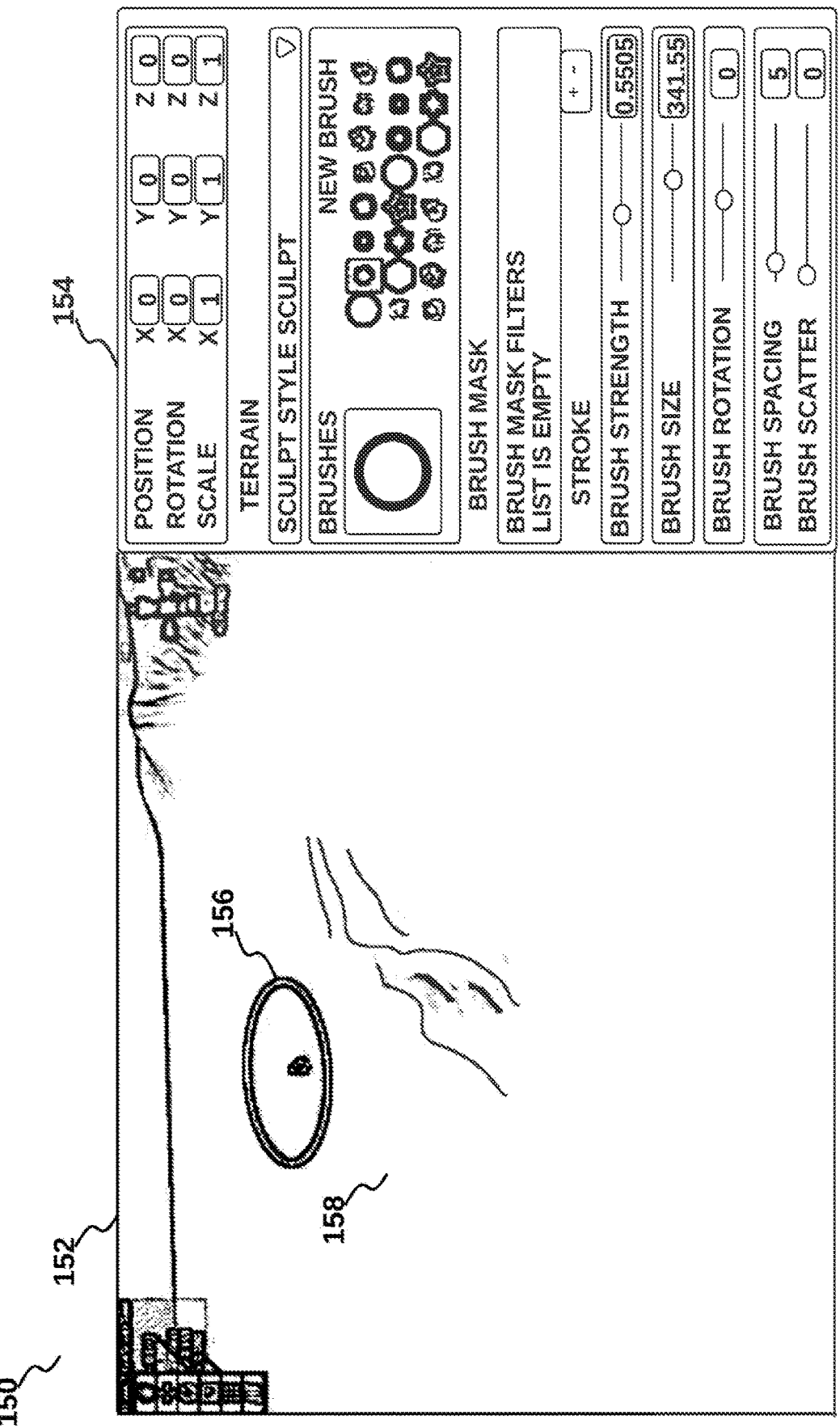
FIG. 1B is an illustration of a screenshot showing an example user interface tool that includes interactive tile-based ML terrain generation, in accordance with one embodiment.
Figure 1C:
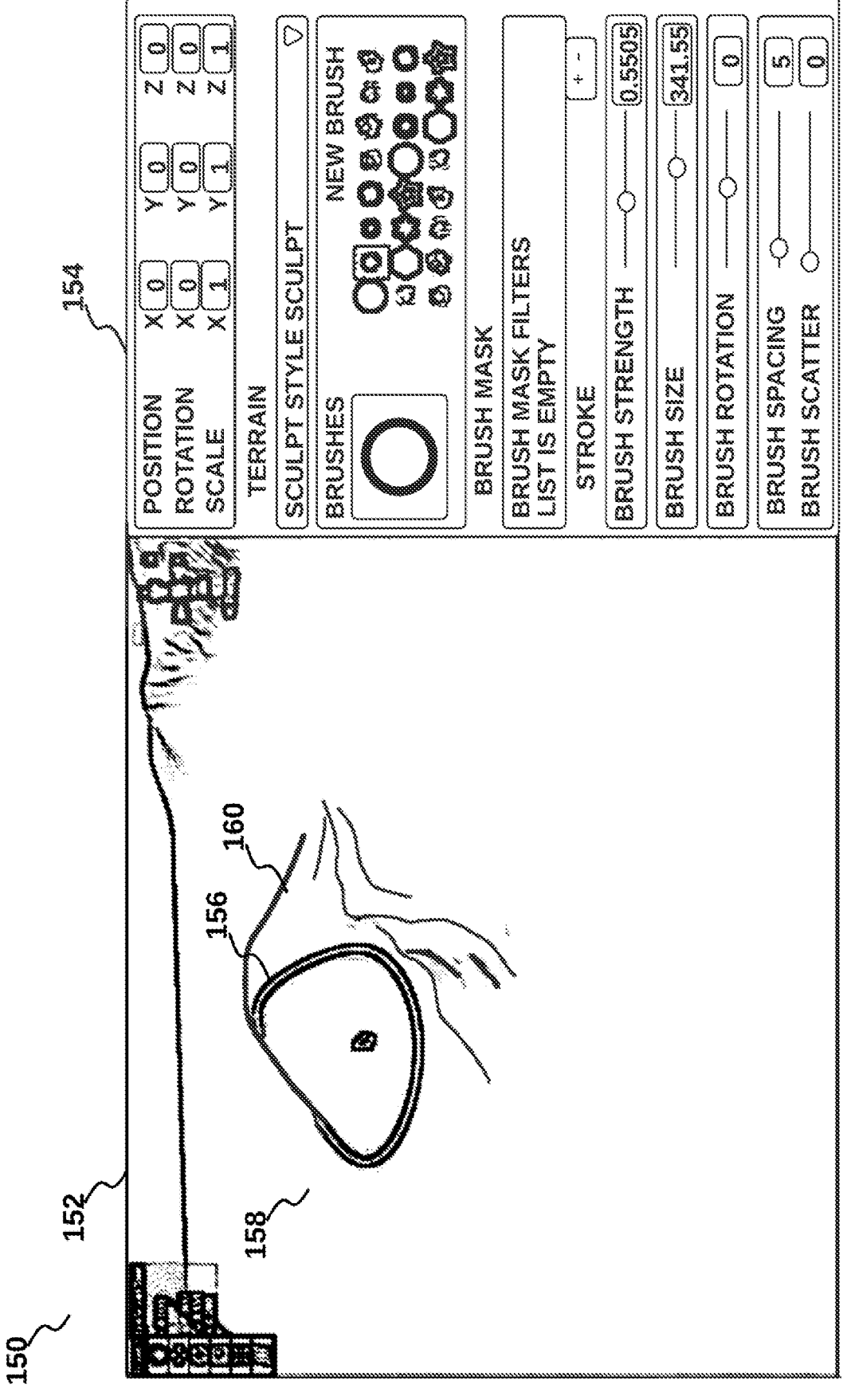
FIG. 1C is an illustration of a screenshot showing an example user interface tool that includes interactive tile-based ML terrain generation, in accordance with one embodiment.
Figure 1D:
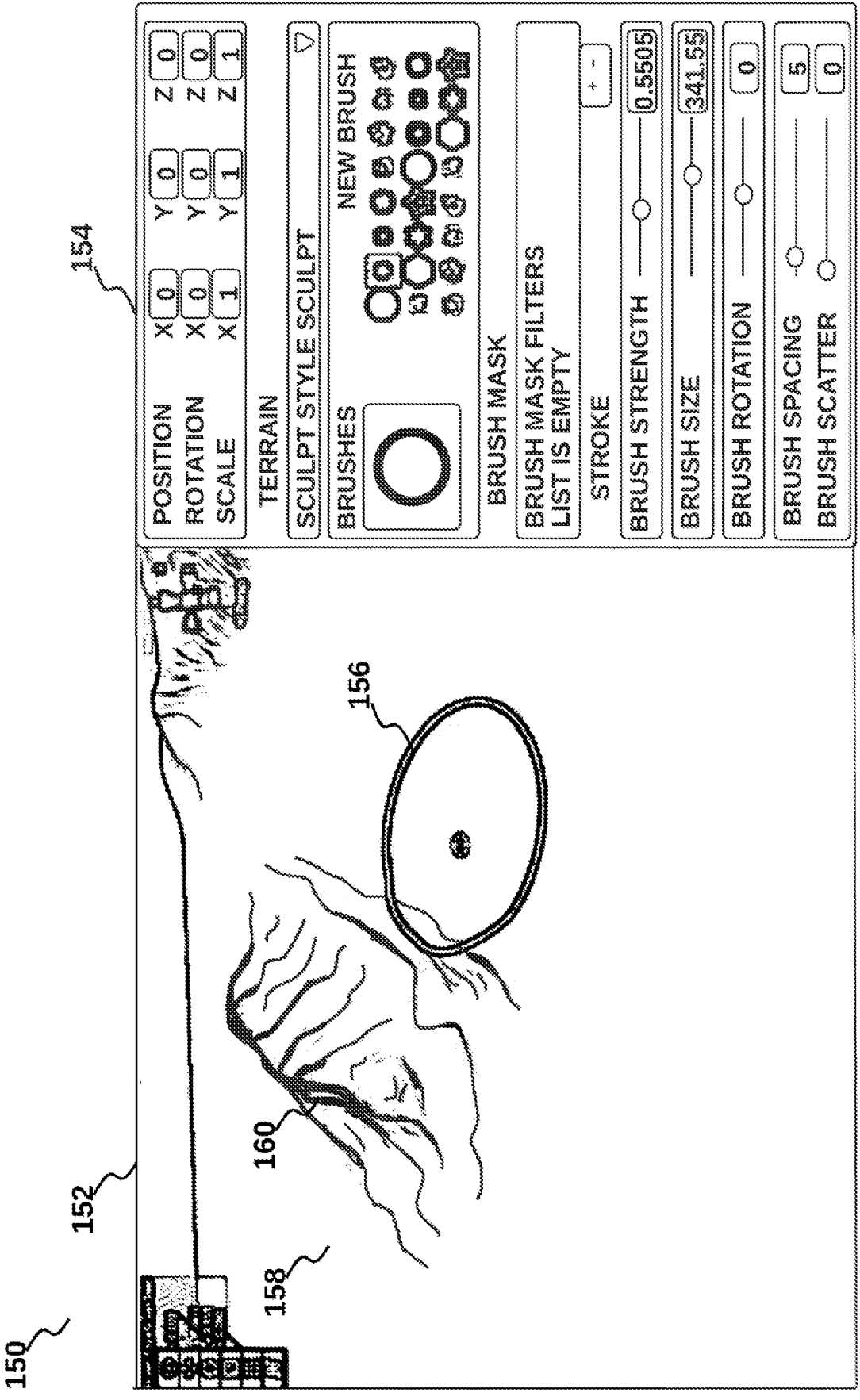
FIG. 1D is an illustration of a screenshot showing an example user interface tool that includes interactive tile-based ML terrain generation, in accordance with one embodiment.

In accordance with an embodiment, and shown in FIG. 1B, FIG. 1C, and FIG. 1D, is a set of illustrations of a user interface 150 that includes a brush tool 156 that uses the interactive tile-based ML terrain generation method 100. The user interface 150 may include a first display area 152 showing a view of a virtual environment (e.g., a 3D virtual environment) that includes a surface 158 (e.g., a surface within a game level). The user interface 150 may include a second display area 154 that includes a set of brush tools and associated settings and properties. The second display area 154 may also include displayed information describing the virtual environment displayed in the first display area 152

(e.g., position, rotation and scale as shown in FIG. 1B, FIG. 1C, and FIG. 1D). The fast phase 104 can be seen by a quick change in height of the digital surface 158 (e.g., between FIG. 1B and FIG. 1C) as the tool 156 passes over the surface 158, followed by an addition of surface details (e.g., shown in FIG. 1D) a short time afterwards generated by the slow phase 106. While not specifically shown in FIG. 1B and FIG. 1C, the brush tool 156 may be dragged back and forth over the surface 158 (e.g., by a user interacting with the brush tool 156) during the interactive phase 104 to sculpt a basic shape (e.g., the hill 160 shown in FIG. 1C). As an example, an amount of time the brush tool 156 is placed over an area of the surface 158 may be linked to an amount of height modification in the fast phase 104 (e.g., longer lingering of the brush tool 156 over an area may cause the area to have a large height modification. While FIG. 1B shows a flat initial surface 158, the interactive tile-based ML terrain generation method 100 may be applied to any initial surface shape and topology, and may be iteratively applied to an output (e.g., the brush tool may iteratively be used on a same area). For example, the interactive tile-based ML terrain generation method 100 may start with a flat surface (e.g., as shown FIG. 1B), and may also start with a detailed mountain surface (e.g., as shown in FIG. 1D).

While the example shown in FIG. 1B through FIG. 1D is additive (e.g., an increase in height leading to a mountain), the interactive tile-based ML terrain generation method 100 can also include a subtractive interactive phase 104 wherein a surface height is first reduced to create a depression (e.g., a ditch, a groove, or similar) in the interactive phase 104. For example, the subtractive interactive phase may be used to create a river, with the first interactive phase 104 creating a shape of the river and the second asynchronous phase 106 creating details of the surface of the riverbed.

In accordance with an embodiment, the user interface 150 may include a plurality of brush masks (e.g., including a plurality of brush types and masks as shown within second display area 154) to shape the digital surface 158 in a variety of ways.

In accordance with an embodiment, the slow asynchronous ML tile phase 106 operates on a same set of pixels touched by the fast preview phase 104, for example as identified by the asynchronous mask. During the slow asynchronous phase 106, work may be divided into tiles 142 in order to accommodate processing time and to limit the memory required to run a machine-learning model.

In accordance with an embodiment, tiles 142 may be queued and sorted for scheduling based on a priority of the closest tiles to the last touch of the sculpt brush within the synchronous phase 104. Once a tile is processed, its contents are composited back onto the terrain (e.g., at operation 146) using an alpha value from the asynchronous mask of the fast phase 104. The contents of the tile inside the asynchronous mask may be cleared after it is processed (e.g., at operation 148), in order to indicate a tile is finished. The asynchronous mask may be used to exactly identify any unprocessed pixels. This mask may be sampled by the GPU (e.g., at operation 140) to detect changes.

In accordance with an embodiment, there may be a tile scheduler which includes a deferred execution timer set to a small configurable value such as 200 milliseconds. That timer is reset each time a user paints in order to minimize a number of interrupted tiles. For example, work (e.g., during operation 144) may not be scheduled to execute on a tile until this timer reaches zero.

In accordance with an embodiment, in order to avoid a feedback loop between the output of the two phases, a copy of the terrain's height map may be saved at the moment a brush tool 156 is selected. The original terrain may then become a volatile target of both phases, while the copy (e.g., which is an unstyled height map) becomes the non-volatile source of input to the ML model. The copy receives the same raise/lower modification (e.g., within operation 122) as the real-time phase output. However, the copy does not receive output from the ML model (e.g., at operation 144).

In accordance with an embodiment, based on a user painting a tile while the tile is being processed, the tile may be re-queued. The ML model can execute the same tile repeatedly without leaking output back into the input.

Figure 2A:
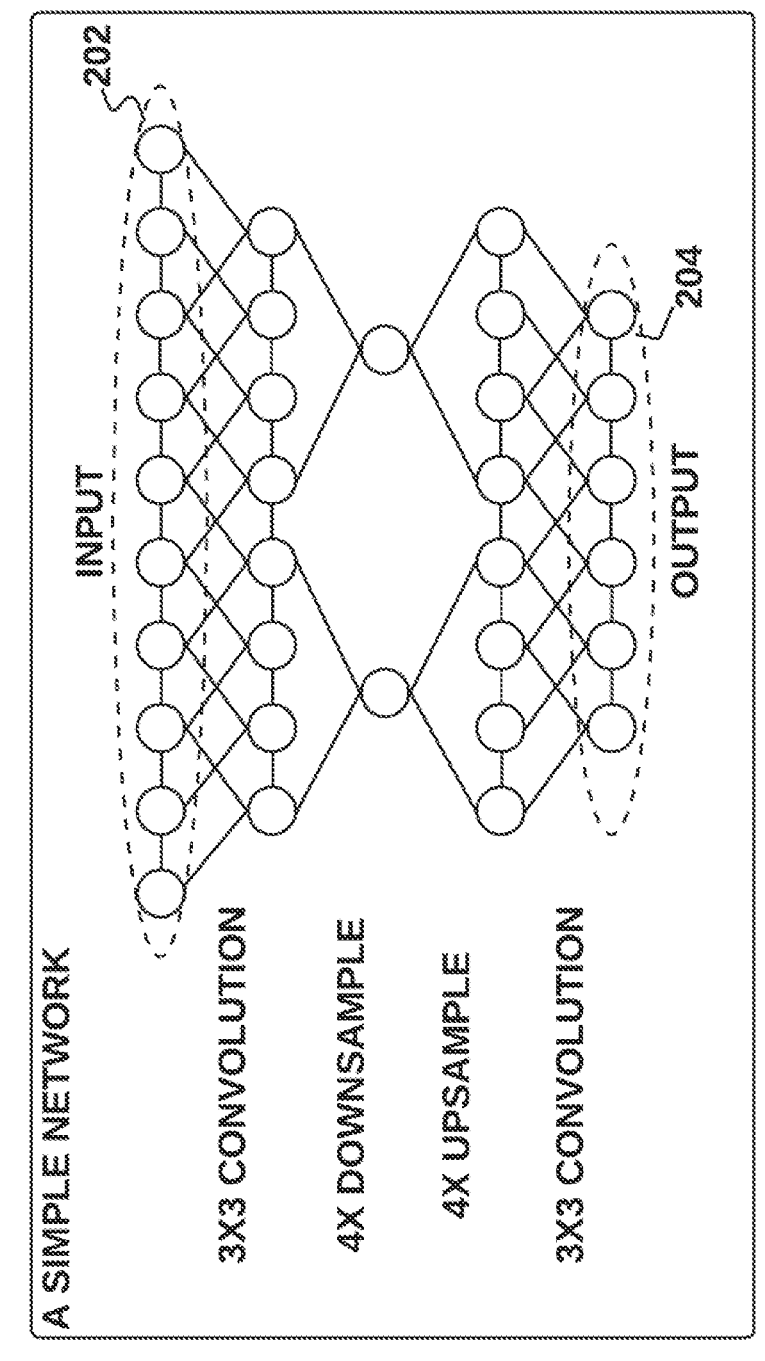
FIG. 2A is a schematic illustrating a simple neural network, in accordance with one embodiment.
Figure 2B:
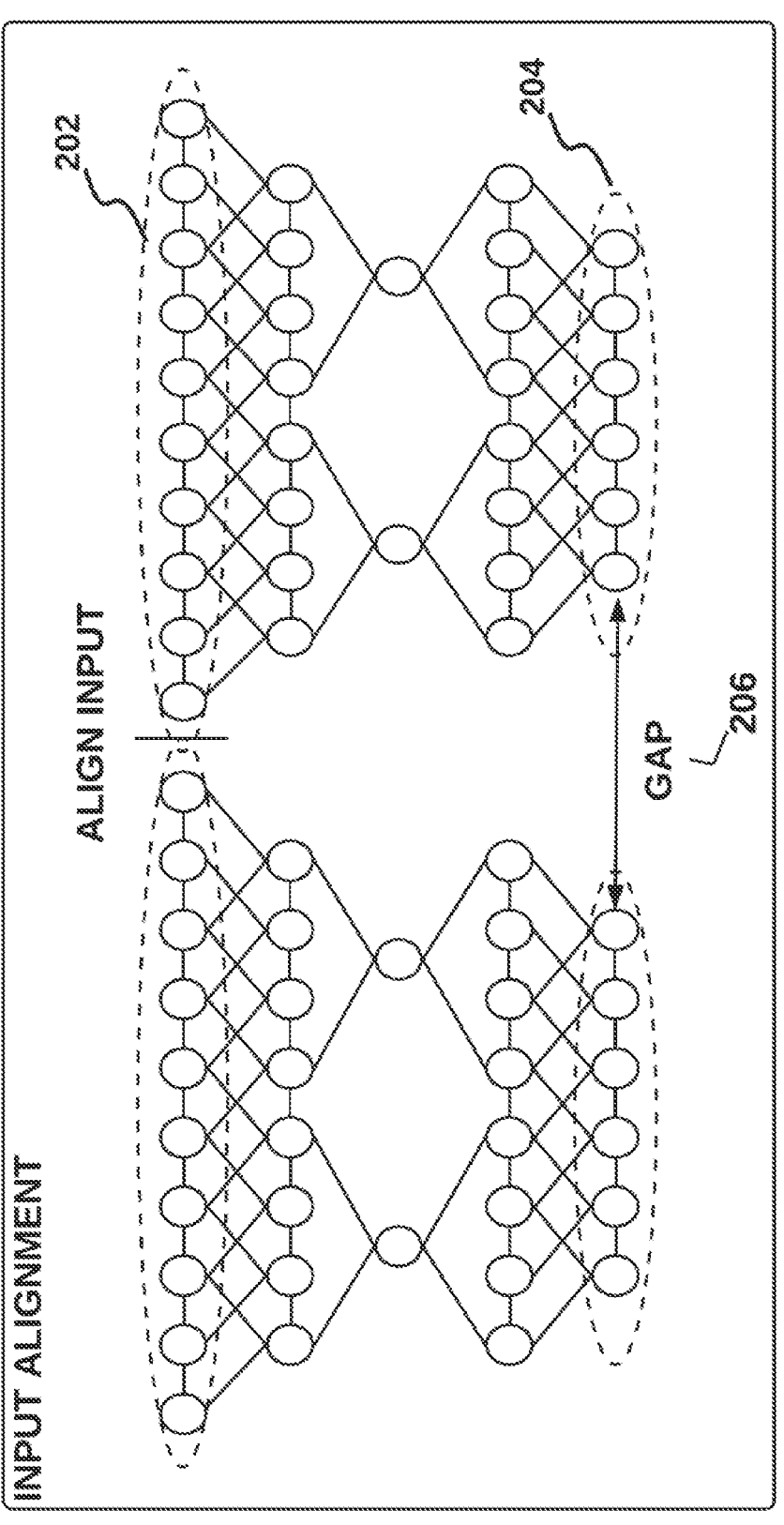
FIG. 2B is a schematic illustrating an input alignment of a simple neural network within a tiling scenario, in accordance with one embodiment.

In accordance with an embodiment, the machine learning generation may be divided into tiles 142 to reduce memory consumption. There is described herein a novel method of training and running ML models that produce continuity between tiles with no visible boundaries (e.g., within an output terrain surface) or artifacts, and wherein the method does not blend an output of tiles together. As shown in FIG. 2A, a ML model operates intrinsically on a receptive field input (e.g., a set of pixels within the brush tool 156), where every output pixel is the result of processing a wide area of input pixels. There is described herein a technique referred to as "stride alignment" that can subdivide an input such that the receptive field is perfectly equivalent between tiled and un-tiled output. As shown in FIG. 2A, a deep convolutional neural network may be thought of as a funnel wherein the input 202 is wider than the output 204. The input may be a texture or image (e.g., a set of pixels on the surface 158 within the brush tool 156). The difference between the two (e.g., the input 202 and the output 204), sometimes referred to as "pad" is the receptive field (e.g., as shown in FIG. 2B). This funnel width is exactly the number of input pixels that can affect a single output pixel.

FIG. 2B shows a tiling problem when an input is tiled and the tiles are aligned at the input. The problem is a gap 206 in the output.

Figure 2C:
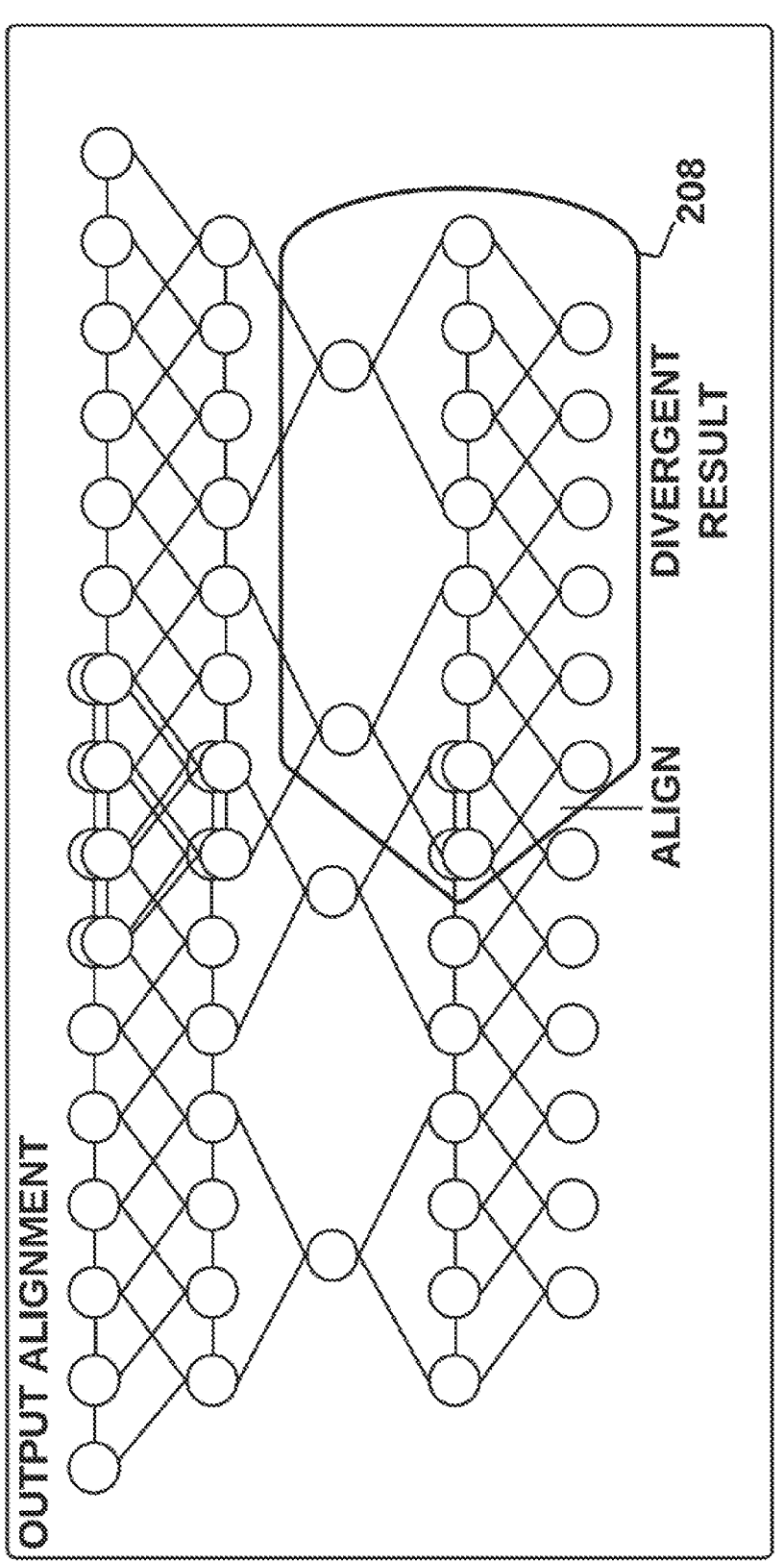
FIG. 2C is a schematic illustrating an output alignment of a simple neural network within a tiling scenario, in accordance with one embodiment.

FIG. 2C shows a tiling problem that arises when an output is aligned in a tiling scenario. The output will often have a divergent result 208 (e.g., output values that are not equivalent to output values determined without any tiling.

Figure 2D:
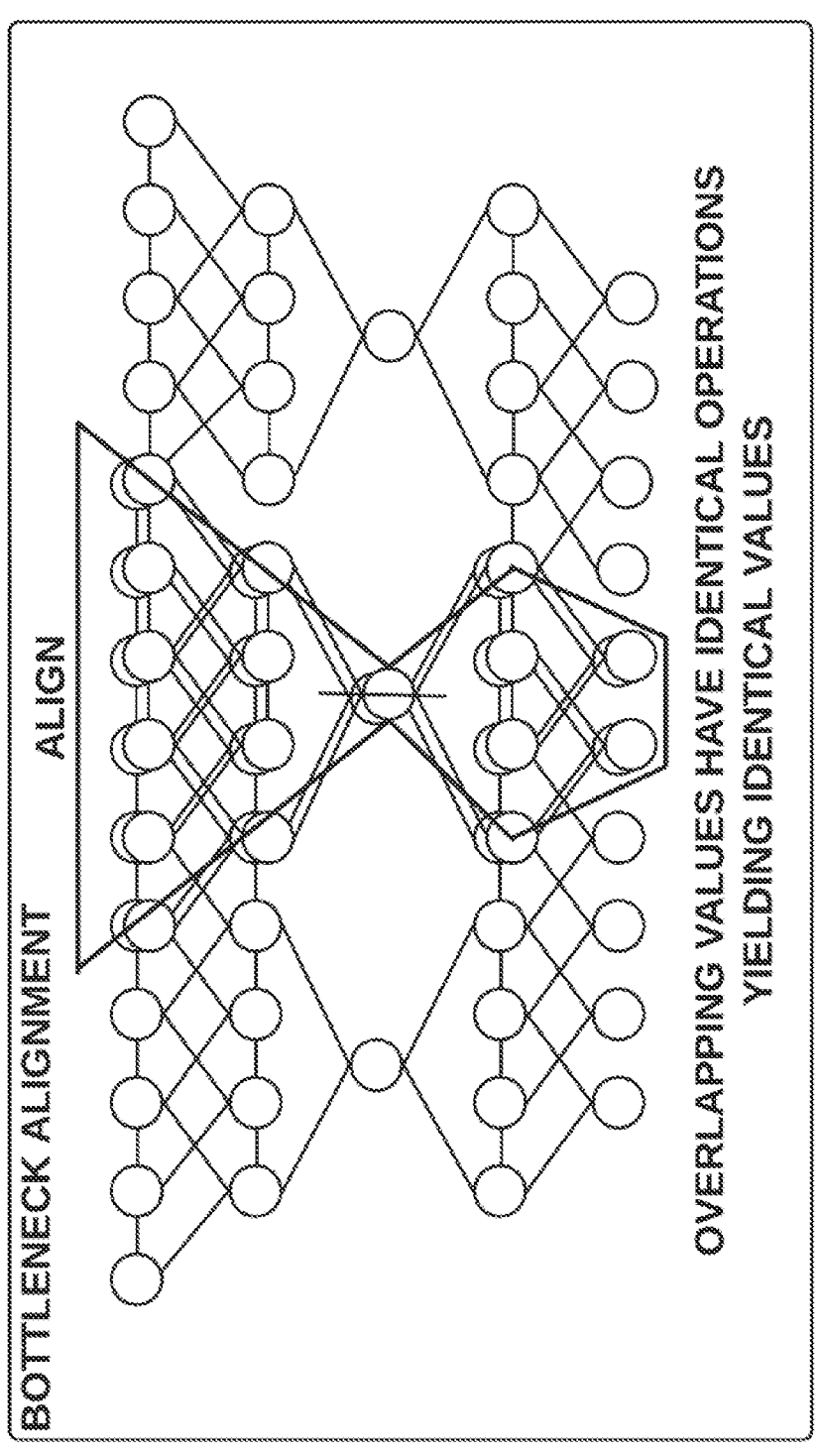
FIG. 2D is a schematic illustrating a bottleneck alignment of a simple neural network within a tiling scenario, in accordance with one embodiment.

FIG. 2D shows a bottleneck alignment wherein overlapping values have identical operations and therefore yield identical output values.

Figure 2E:
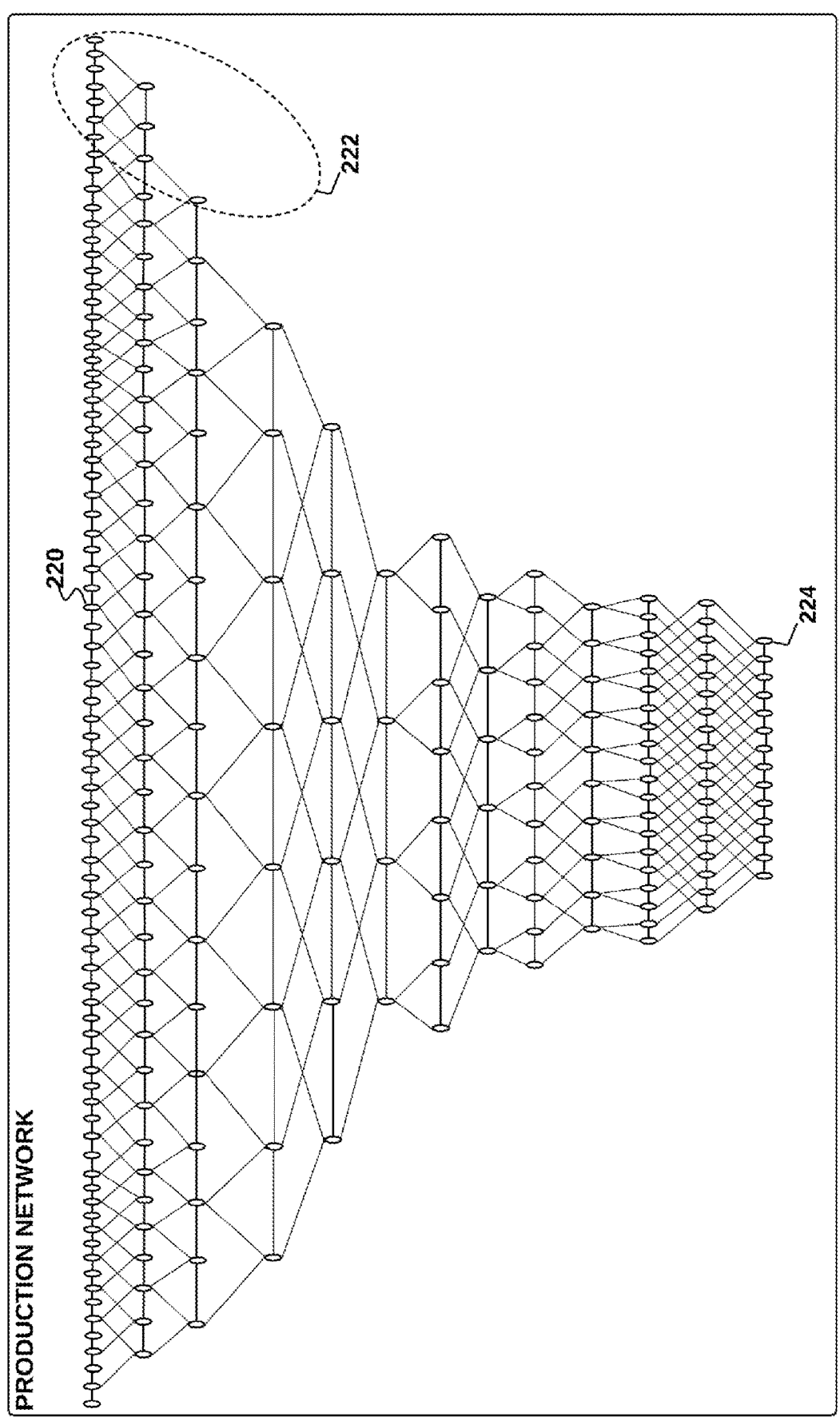
FIG. 2E is a schematic illustrating an example problematic input and neural network within a tiling scenario, in accordance with one embodiment.

FIG. 2E shows an example neural network with 1 block Resnet, 3 downsamples, 3 upsamples, 7×7 start convolution, and 5×5 end convolution. If this neural network is used on the example input 220 shown in FIG. 2E some of the input 222 is wasted and does not contribute to the output. In addition, the input 220 is not centered on the output.

Figure 2F:
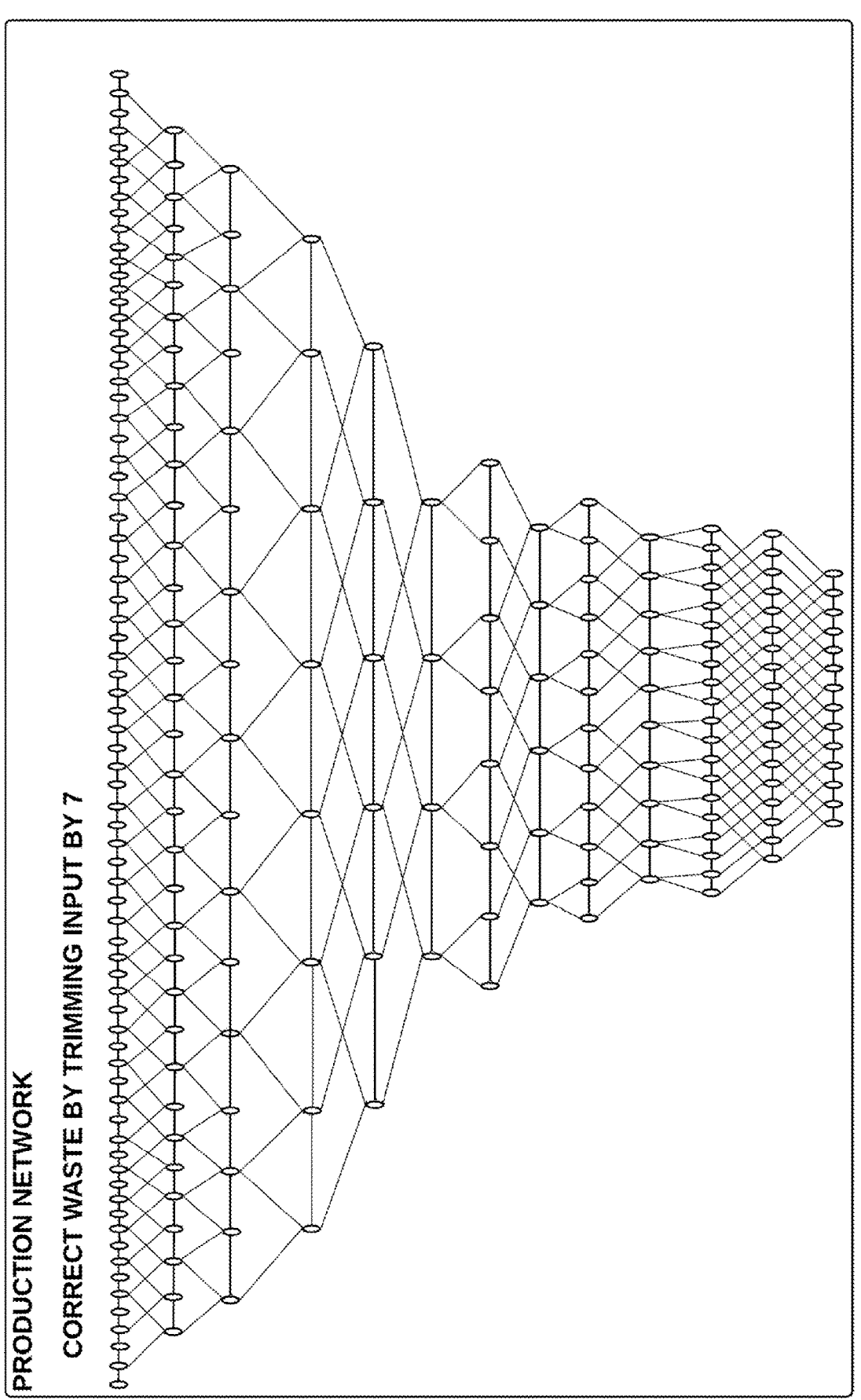
FIG. 2F is a schematic illustrating a first step to correcting an example problematic input and neural network within a tiling scenario, in accordance with one embodiment.
Figure 2G:
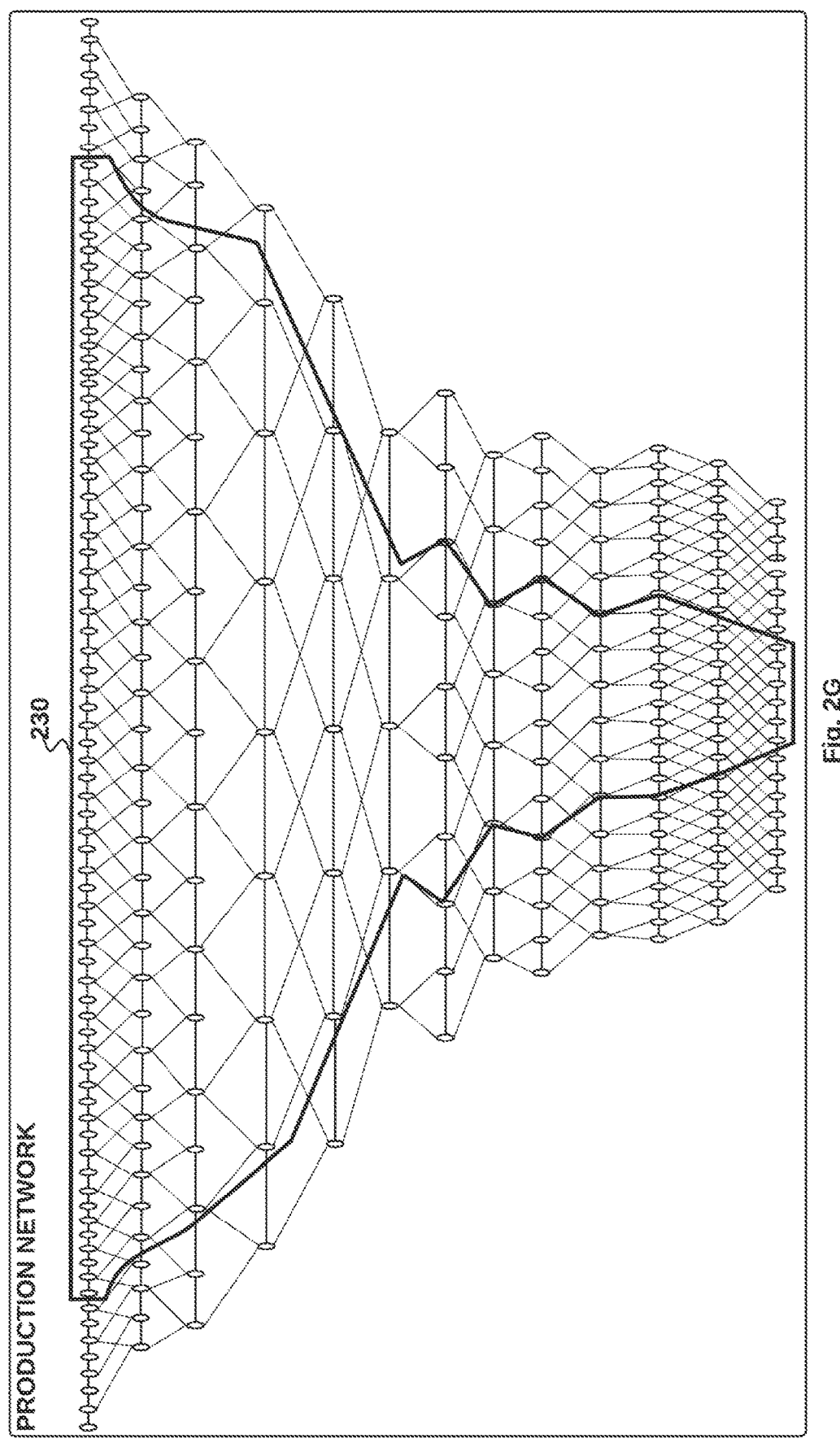
FIG. 2G is a schematic illustrating a second step to correcting an example problematic input and neural network within a tiling scenario, in accordance with one embodiment.

FIG. 2F shows a first step in an alignment procedure performed in operation 144 wherein the wasted input 222 of the example neural network of FIG. 2E is trimmed (e.g., removed). FIG. 2G shows a second step in the alignment procedure performed in operation 144 wherein a second tile is added (on the right side in FIG. 2G) and aligned by bottle neck size (e.g., size 8 in this example). In FIG. 2G the overlap 230 (shown grouped in the center) represents identical values and redundant computation between a processing of the two tiles (the first aligned on the left side of FIG. 2G, and the second on the right side of FIG. 2G).

Terraform Sub-Tiling

One difference between generating terrain with tiled and untiled processes is an amount of memory and time it takes to process a small tile versus an entire domain in an untitled scenario. In accordance with an embodiment, the tiled method described herein, including stride alignment achieves perfect equivalence on an output when compared with an output generated with no tiling (e.g., processing an entire input without breaking it into tiles). Existing tiling methods produce a different output when compared to an un-tiled process.

Figure 3A:
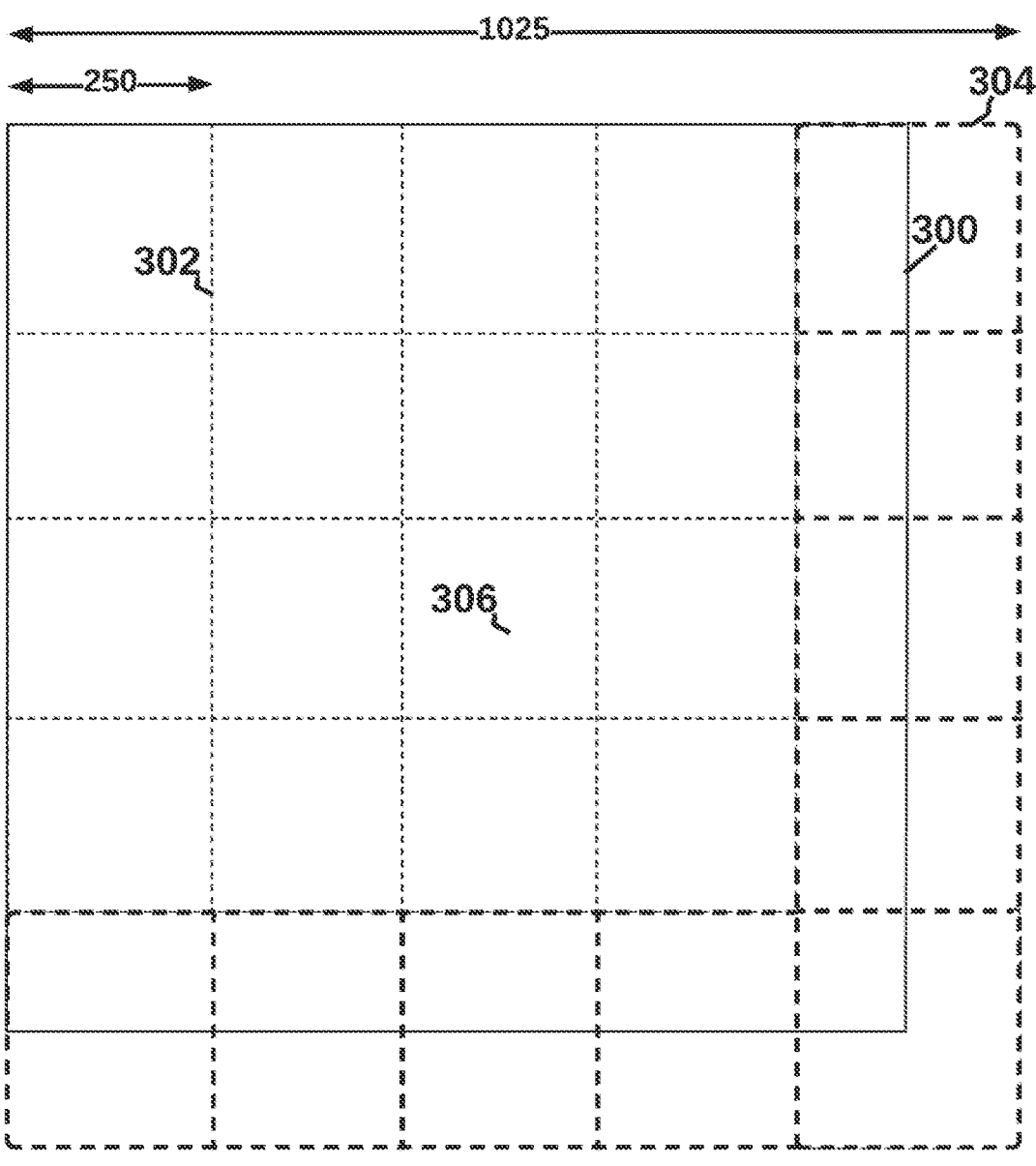
FIG. 3A is a schematic illustrating a sizing and alignment of a tiling grid, in accordance with one embodiment.
Figure 3B:
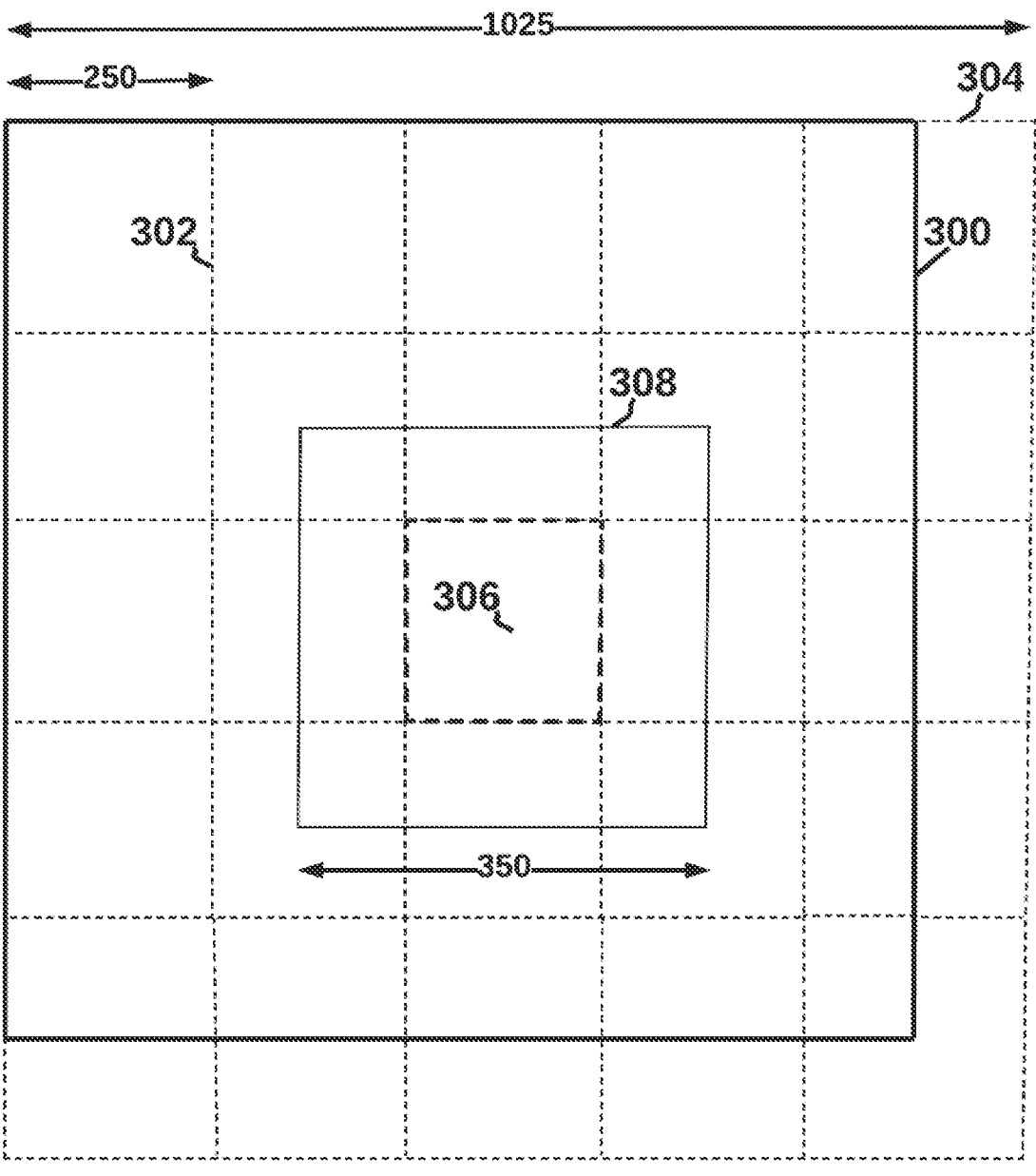
FIG. 3B is a schematic illustrating a sizing and alignment of a tiling grid, in accordance with one embodiment.
Figure 3C:
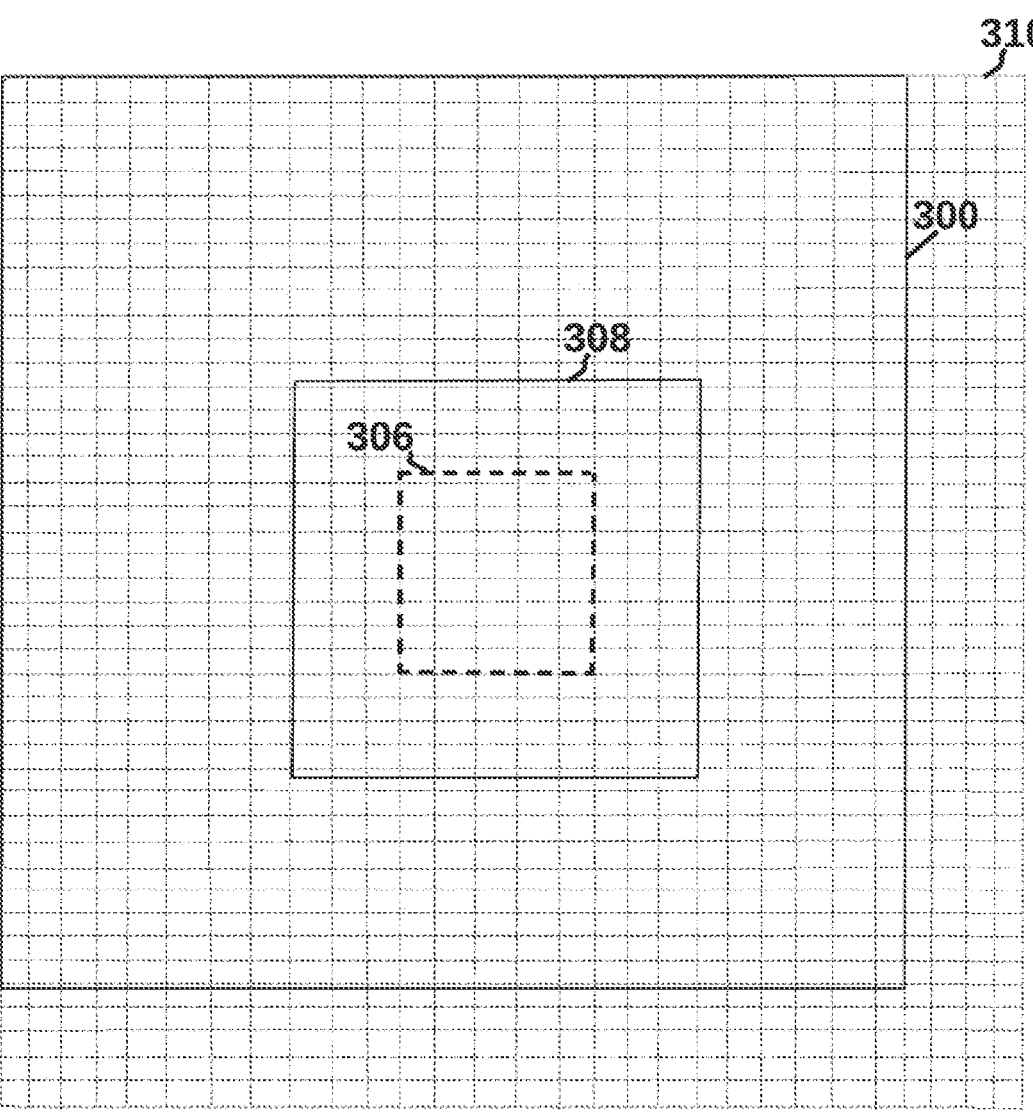
FIG. 3C is a schematic illustrating a sizing and alignment of a tiling grid, in accordance with one embodiment.

In accordance with an embodiment, FIG. 3A through 3C shows an example of the problem and an illustration of the stride alignment solution. In accordance with an embodiment, the stride alignment method described herein works with any input texture resolution and dimension. In accordance with an embodiment, and as shown in FIG. 3A, the method may receive an input texture, and as part of a tiling process/module divides the received input into smaller, more performant tiles (e.g., with respect to computation speed and memory usage) to allow interactivity in the fast phase 104.

In accordance with an embodiment, and as shown in FIG. 3A, there is an input to the ML model (e.g., operation 144) with a 1025×1025 texture size represented by a light green square 300. A process within operation 144 defines a smaller tile size (e.g., 250 in this example) shown by the dashed red squares 302. Though shown in this example with a tile size of 250, the stride alignment method places no restrictions on the tile size being a perfect divisor of the input texture size. However, based on the tile size not being a perfect divisor of the input texture size, some of the tiles sample outside the input texture region (e.g., the bold red squares 304 on the right and bottom). In accordance with an embodiment, within this overhang area 304, as part of the stride alignment method, the values at the edge of the input texture are clamped when used as input (e.g., this may be a texture clamp operation in a shader).

Input Padding

When a ML model within operation 144 accepts input, it expects the input to be padded sufficiently on all sides so it can provide the correct output after the various convolution filters are applied on it. This may be configured as a setting for operation 144. For any sub-tile created in the tiling process (e.g., tile 306), additional pixels from the input are included in the processing to satisfy any padding requirement in order for the model to function correctly. As shown in FIG. 3B, based on the bold, red square 306 as a currently processing sub-tile, and with an example model pad of 50 on each side, the effective input area included for this subtitle is shown by the blue square 308 of side length 350 px.

Stride

In accordance with an embodiment, the stride alignment method determines an additional parameter called Stride. The stride value may define a grid, and which may be predetermined and represents a neural network's model's internal input requirement to maintain perfectly tileable output. To ensure perfectly tileable output, the padded input (blue square 308) must be aligned with a grid defined by the stride value. The stride is shown in FIG. 3C, wherein only the current input tile 306 and its padding 308 are being processed. In FIG. 3C there is a stride grid 310 comprised of dotted gray lines. For this example, let's assume that the stride defined is 8 px, such that the stride grid 310 has 8×8 px squares.

Figure 3D:
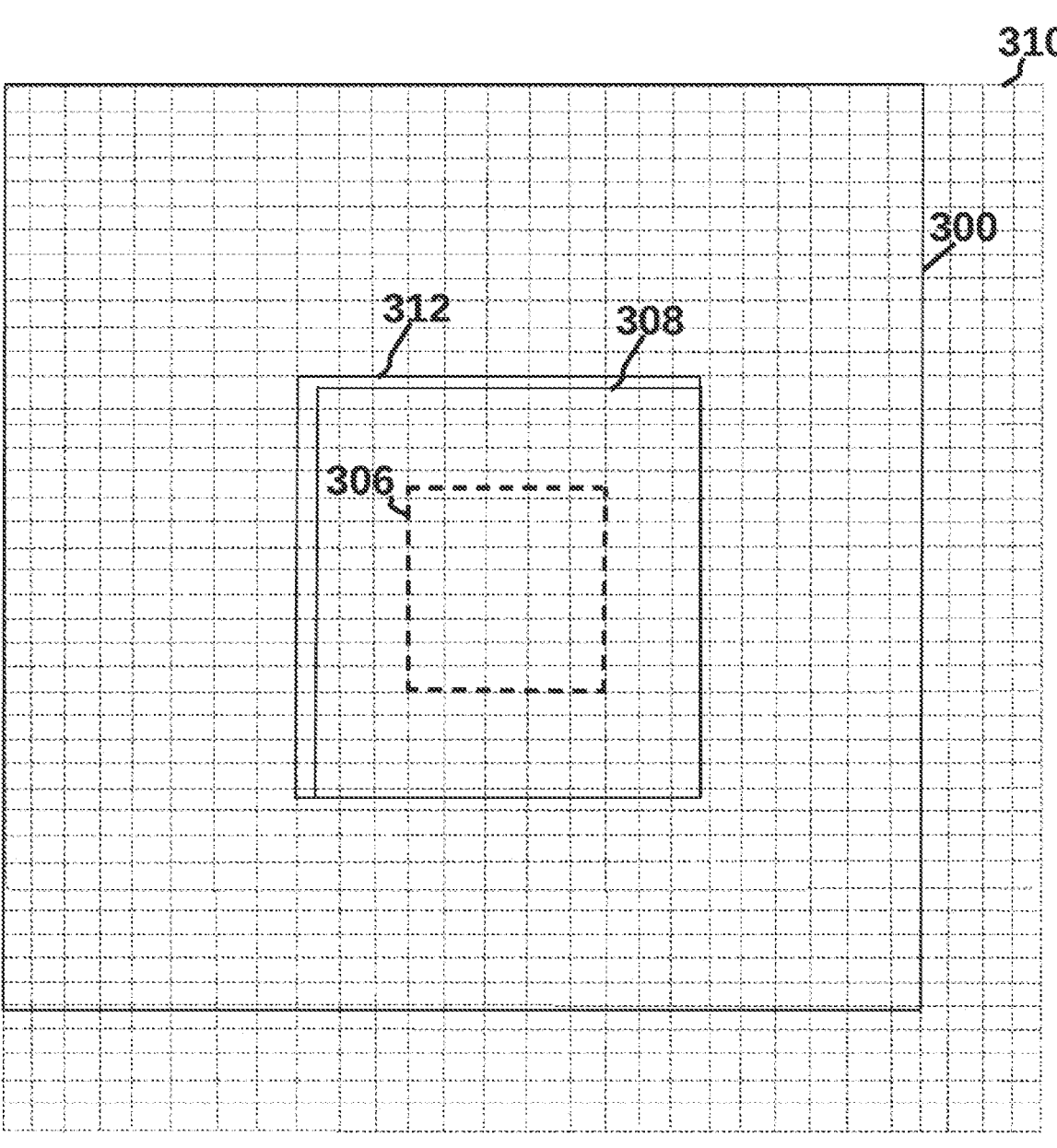
FIG. 3D is a schematic illustrating a sizing and alignment of a tiling grid, in accordance with one embodiment.

As part of the stride alignment method, in order to align to the stride grid 310, the padded blue square 308 is expanded by a small amount on the left and top edges. We see this expansion in FIG. 3D as the solid black square 312. The black square 312 is guaranteed to be aligned to the stride only on the left and top edges. The right and bottom edges may or may not be aligned with stride.

In accordance with an embodiment, model output sizes are increments of stride, but they do not have to be multiples of stride, as there is typically an offset. As an example, a valid size of 254 may have a stride of 8, so valid output sizes include 262 and 246 (i.e., increments of 8 with a modulo of 6). That modulo is equivalent to the minimum amount of overlap that must be accounted for in tiling.

ML Training

In accordance with an embodiment, a quality of generative height ML models (e.g., within operation 144) has been improved by converting input and output of an ML model to a difference-of-gaussian (DOG). The DOG has a more normalized distribution of values than absolute height and may lead to more stable training, producing higher quality output in a shorter length of training time.

In example embodiments, one or more artificial intelligence agents, such as one or more machine-learned algorithms or models described herein and/or a neural network of one or more such machine-learned algorithms or models may be trained iteratively (e.g., in a plurality of stages) using a plurality of sets of input data. For example, a first set of input data may be used to train one or more of the artificial agents. Then, the first set of input data may be transformed (e.g., by applying one or more improvements or conversions described herein) into a second set of input data for retraining the one or more artificial intelligence agents. In example embodiments, the artificial intelligence agents may be continuously updated and retrained and may then be applied to subsequent novel input data to generate one or more of the outputs described herein.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 4:
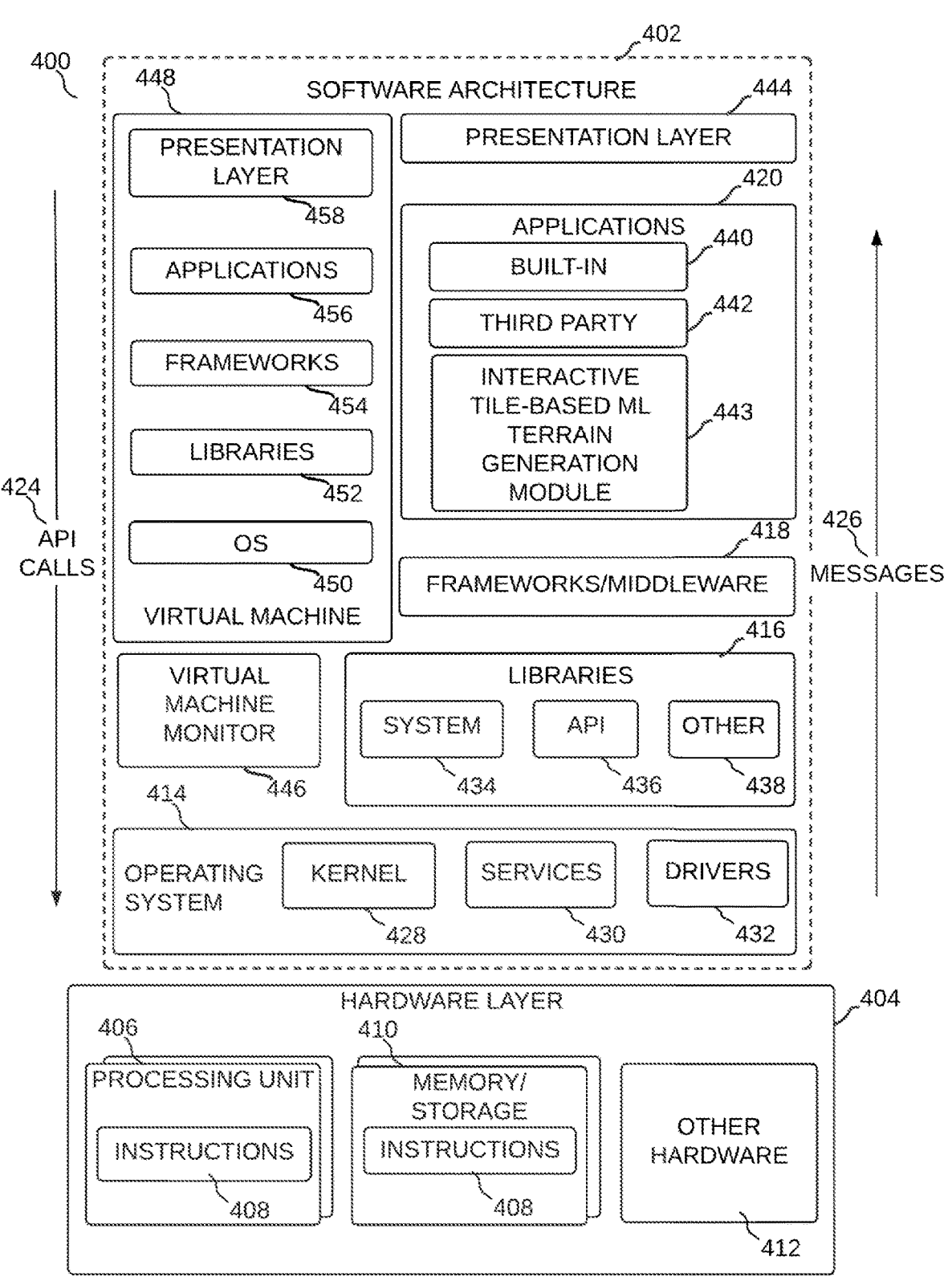
FIG. 4 is a block diagram illustrating an example software architecture, which may be used in conjunction with various hardware architectures described herein.

FIG. 4 is a block diagram 400 illustrating an example software architecture 402, which may be used in conjunction with various hardware architectures herein described to provide a gaming engine and/or components of the interactive tile-based ML terrain generation system. FIG. 4 is a non-limiting example of a software architecture and it will be appreciated that many other architectures may be implemented to facilitate the functionality described herein. The software architecture 402 may execute on hardware such as a machine 500 of FIG. 5 that includes, among other things, processors 510, memory 530, and input/output (I/O) components 550. A representative hardware layer 404 is illustrated and can represent, for example, the machine 500 of FIG. 5. The representative hardware layer 404 includes a processing unit 406 having associated executable instructions 408. The executable instructions 408 represent the executable instructions of the software architecture 402, including implementation of the methods, modules and so forth described herein. The hardware layer 404 also includes memory/storage 410, which also includes the executable instructions 408. The hardware layer 404 may also comprise other hardware 412.

In the example architecture of FIG. 4, the software architecture 402 may be conceptualized as a stack of layers where each layer provides particular functionality. For example, the software architecture 402 may include layers such as an operating system 414, libraries 416, frameworks or middleware 418, applications 420 and a presentation layer 444. Operationally, the applications 420 and/or other components within the layers may invoke application programming interface (API) calls 424 through the software stack and receive a response as messages 426. The layers illustrated are representative in nature and not all software architectures have all layers. For example, some mobile or special purpose operating systems may not provide the frameworks/middleware 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 416 may provide a common infrastructure that may be used by the applications 420 and/or other components and/or layers. The libraries 416 typically provide functionality that allows other software modules to perform tasks in an easier fashion than to interface directly with the underlying operating system 414 functionality (e.g., kernel 428, services 430 and/or drivers 432). The libraries 516 may include system libraries 434 (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) provide a higher-level common infrastructure that may be used by the applications 420 and/or other software components/modules. For example, the frameworks/middleware 418 may provide various graphic user interface (GUI) functions, high-level resource management, high-level location services, and so forth. The frameworks/ middleware 418 may provide a broad spectrum of other APIs that may be utilized by the applications 420 and/or other software components/modules, some of which may be specific to a particular operating system or platform.

The applications 420 include built-in applications 440 and/or third-party applications 442. Examples of representative built-in applications 440 may include, but are not limited to, a contacts application, a browser application, a book reader application, a location application, a media application, a messaging application, and/or a game application. Third-party applications 442 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 442 may invoke the API calls 424 provided by the mobile operating system such as operating system 414 to facilitate functionality described herein. Applications 420 may include an interactive tile-based ML terrain generation module 443 which may implement the interactive tile-based ML terrain generation method 100 described in at least FIG. 1A.

The applications 420 may use built-in operating system functions (e.g., kernel 428, services 430 and/or drivers 432), libraries 416, or frameworks/middleware 418 to create user interfaces to interact with users of the system. Alternatively, or additionally, in some systems, interactions with a user may occur through a presentation layer, such as the presentation layer 444. In these systems, the application/module "logic" can be separated from the aspects of the application/ module that interact with a user.

Some software architectures use virtual machines. In the example of FIG. 4, this is illustrated by a virtual machine 448. The virtual machine 448 creates a software environment where applications/modules can execute as if they were executing on a hardware machine (such as the machine 500 of FIG. 5, for example). The virtual machine 448 is hosted by a host operating system (e.g., operating system 414) and typically, although not always, has a virtual machine monitor 446, which manages the operation of the virtual machine 448 as well as the interface with the host operating system (i.e., operating system 414). A software architecture executes within the virtual machine 448 such as an operating system (OS) 450, libraries 452, frameworks 454, applications 456, and/or a presentation layer 458. These layers of software architecture executing within the virtual machine 448 can be the same as corresponding layers previously described or may be different.

Figure 5:
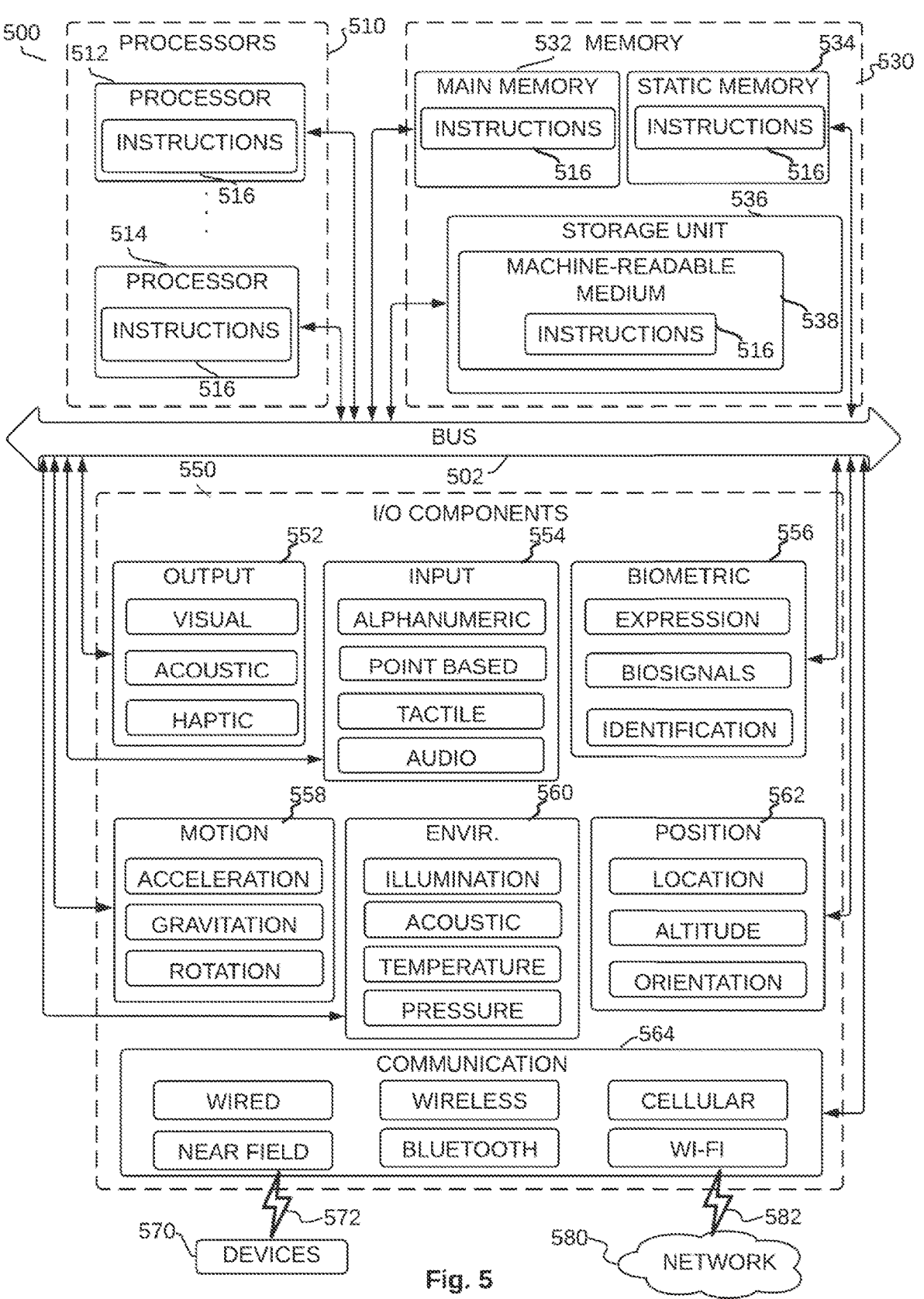
FIG. 5 is a block diagram illustrating components of a machine, according to some example embodiments, configured to read instructions from a machine-readable medium (e.g., a machine-readable storage medium) and perform any one or more of the methodologies discussed herein.

FIG. 5 is a block diagram illustrating components of a machine 500, according to some example embodiments, configured to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. As such, the instructions 516 may be used to implement modules or components described herein. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines that individually or jointly execute the instructions 516 to perform any one or more of the methodologies discussed herein.

The machine 500 may include processors 510, memory 530, and input/output (I/O) components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 512 and a processor 514 that may execute the instructions 516. The term "processor" is intended to include multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core processor), multiple processors with a single core, multiple processors with multiples cores, or any combination thereof.

The memory/storage 530 may include a memory, such as a main memory 532, a static memory 534, or other memory, and a storage unit 536, both accessible to the processors 510 such as via the bus 502. The storage unit 536 and memory 532, 534 store the instructions 516 embodying any one or more of the methodologies or functions described herein. The instructions 516 may also reside, completely or partially, within the memory 532, 534, within the storage unit 536, within at least one of the processors 510 (e.g., within the processor's cache memory), or any suitable combination thereof, during execution thereof by the machine 500. Accordingly, the memory 532, 534, the storage unit 536, and the memory of processors 510 are examples of machine-readable media 538.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 550 may include a wide variety of components to receive input, provide output, produce output, transmit information, exchange information, capture measurements, and so on. The specific input/output (I/O) components 550 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 550 may include many other components that are not shown in FIG. 5. The input/output (I/O) components 550 are grouped according to functionality merely for simplifying the following discussion and the grouping is in no way limiting. In various example embodiments, the input/output (I/O) components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 550 may include communication components 564 operable to couple the machine 500 to a network 580 or devices 570 via a coupling 582 and a coupling 572 respectively. For example, the communication components 564 may include a network interface component or other suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 562, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and aug-mented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment, including, for example, 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:
one or more computer processors;
one or more computer memories;
a set of instructions stored in the one or more computer memories, the set of instructions configuring the one or more computer processors to perform operations, the operations comprising:
at a first phase of a painting of a digital environment using a brush tool, approximating a modification to a terrain surface of the digital environment, the approximating including decomposing a stroke of the brush tool into one or more stamps, each of the one or more stamps changing a height of a portion of terrain surface as the brush tool passes over the portion of the terrain surface; and at a second phase of the painting of the digital environment, adding details to the portion of the terrain surface passed over by each of the one or more stamps, the adding of the details including dividing work associated with the adding of the details into one or more tiles and processing the one or more tiles, wherein the first phase is a synchronous preview phase used for user interaction and the second phase is slower than and asynchronous with the first phase.

2. The system of claim 1, wherein the changing of the height based on using an offset multiplied by a mask associated with the stamp.

3. The system of claim 1, wherein the processing of the one or more tiles includes scheduling the one or more tiles based on priorities of the closest tiles of the one or more tiles to a last touch of the brush tool within the first phase.

4. The system of claim 1, wherein the one or more tiles are selected to limit processing time or memory needed to run a machine-learning model for implementing the modification.

5. The system of claim 4, wherein a stability or quality of the machine-learning model is improved by converting an absolute height into a difference-of-gaussian (DOG).

6. The system of claim 4, wherein the machine-learning model is one of a set of machine-learning models trained to produce a detailed height from course input, a flow map, a deposition map, a wear map, or a vegetation canopy.

7. The system of claim 4, wherein the machine-learning model is trained to produce continuity between the one or more tiles.

8. A non-transitory computer-readable storage medium storing a set of instructions that, when executed by one or more computer processors, cause the one or more computer processors to perform operations, the operations comprising:

at a first phase of a painting of a digital environment using a brush tool, approximating a modification to a terrain surface of the digital environment, the approximating including decomposing a stroke of the brush tool into one or more stamps, each of the one or more stamps changing a height of a portion of terrain surface as the brush tool passes over the portion of the terrain surface; and at a second phase of the painting of the digital environment, adding details to the portion of the terrain surface passed over by each of the one or more stamps, the adding of the details including dividing work associated with the adding of the details into one or more tiles and processing the one or more tiles, wherein the first phase is a synchronous preview phase used for user interaction and the second phase is slower than and asynchronous with the first phase.

9. The non-transitory computer-readable storage medium of claim 8, wherein the changing of the height based on using an offset multiplied by a mask associated with the stamp.

10. The non-transitory computer-readable storage medium of claim 8, wherein the processing of the one or more tiles includes scheduling the one or more tiles based on priorities of the closest tiles of the one or more tiles to a last touch of the brush tool within the first phase.

11. The non-transitory computer-readable storage medium of claim 8, wherein the one or more tiles are selected to limit processing time or memory needed to run a machine-learning model for implementing the modification.

12. The non-transitory computer-readable storage medium of claim 11, wherein a stability or quality of the machine-learning model is improved by converting an absolute height into a difference-of-gaussian (DOG).

13. The non-transitory computer-readable storage medium of claim 11, wherein the machine-learning model is one of a set of machine-learning models trained to produce a detailed height from course input, a flow map, a deposition map, a wear map, or a vegetation canopy.

14. The non-transitory computer-readable storage medium of claim 11, wherein the machine-learning model is trained to produce continuity between the one or more tiles.

15. A method comprising:

at a first phase of a painting of a digital environment using a brush tool, approximating a modification to a terrain surface of the digital environment, the approximating including decomposing a stroke of the brush tool into one or more stamps, each of the one or more stamps changing a height of a portion of terrain surface as the brush tool passes over the portion of the terrain surface; and at a second phase of the painting of the digital environment, adding details to the portion of the terrain surface passed over by each of the one or more stamps, the adding of the details including dividing work associated with the adding of the details into one or more tiles and processing the one or more tiles, wherein the first phase is a synchronous preview phase used for user interaction and the second phase is slower than and asynchronous with the first phase.

16. The method of claim 15, wherein the changing of the height based on using an offset multiplied by a mask associated with the stamp.

17. The method of claim 15, wherein the processing of the one or more tiles includes scheduling the one or more tiles based on priorities of the closest tiles of the one or more tiles to a last touch of the brush tool within the first phase.

18. The method of claim 15, wherein the one or more tiles are selected to limit processing time or memory needed to run a machine-learning model for implementing the modification.

19. The method of claim 18, wherein a stability or quality of the machine-learning model is improved by converting an absolute height into a difference-of-gaussian (DOG).

20. The method of claim 18, wherein the machine-learning model is one of a set of machine-learning models trained to produce a detailed height from course input, a flow map, a deposition map, a wear map, or a vegetation canopy.

* * * * *